US006975783B2

(12) United States Patent
Huang

(10) Patent No.: US 6,975,783 B2
(45) Date of Patent: Dec. 13, 2005

(54) SWITCH CONTROL WITH LIGHT BEAMS

(75) Inventor: Marshall Y. Huang, Glendale, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 165 days.

(21) Appl. No.: 10/371,365

(22) Filed: Feb. 19, 2003

(65) Prior Publication Data

US 2004/0161187 A1 Aug. 19, 2004

(51) Int. Cl.[7] .................................................. G02B 6/12

(52) U.S. Cl. .......................... 385/14; 385/16; 200/181; 250/227.22

(58) Field of Search .............................. 385/14, 16, 18; 361/17, 173, 177; 359/871, 872, 879, 881

(56) References Cited

U.S. PATENT DOCUMENTS 4,303,302 A * 12/1981 Ramsey et al. ............... 385/23
5,544,268 A * 8/1996 Bischel et al. ................. 385/4
5,955,817 A 9/1999 Dhuler et al.
6,075,239 A * 6/2000 Aksyuk et al. ............... 385/16
6,201,644 B1 * 3/2001 Sakata et al. ............... 359/618
6,253,001 B1 * 6/2001 Hoen .......................... 385/17
6,310,339 B1 * 10/2001 Hsu et al. ................... 200/181
6,417,807 B1 7/2002 Hsu et al.
6,453,084 B1 * 9/2002 Stanford et al. .............. 385/18
6,738,539 B2 * 5/2004 Hagood et al. ............... 385/16
6,743,988 B2 * 6/2004 Bao et al. ..................... 385/16
6,763,160 B2 * 7/2004 Laberge et al. ............... 385/17
6,785,038 B2 * 8/2004 Hichwa et al. ............. 359/290
6,785,437 B2 * 8/2004 Hagood et al. ............... 385/16
2002/0080834 A1 6/2002 Kusunose
2003/0012487 A1 1/2003 Hamerly et al.
2004/0013362 A1 * 1/2004 Sateeshchandra ............ 385/33

* cited by examiner

*Primary Examiner*—Brian Healy
*Assistant Examiner*—James P. Hughes
(74) *Attorney, Agent, or Firm*—John A. Miller; Warn, Hoffmann, Miller & LaLone, P.C.

(57) ABSTRACT

An array of micro electromechanical switches (MEMs) (21–35) is actuated by a source of one or more light beams, such as a laser (60). A positioning unit (70) is arranged to direct the one or more light beams onto the MEMs, thereby actuating them without the need for control lines. The positioning unit may include a scanning unit (80) which positions a rotatable mirror (72).

20 Claims, 3 Drawing Sheets

SWITCH CONTROL WITH LIGHT BEAMS

BACKGROUND OF THE INVENTION

The present invention relates generally to control of switches, and more specifically, relates to control of switches with light beams.

Micro electromechanical switches (MEMs) are finding applications in a variety of fields. The MEMs typically are controlled by control lines etched onto semiconductor chips. For many applications, the control lines occupy a significant percentage of the available chip real estate. For example, in applications involving thousands of MEMs, the large number of requisite control lines quickly overwhelm the available area on the chip, thereby limiting performance. This invention addresses the problem and provides a solution.

BRIEF SUMMARY OF THE INVENTION

The preferred embodiment is useful in an array of micro electromechanical switches. In such an environment, the preferred embodiment comprises generating one or more light beams. The one or more light beams are directed onto predetermined ones of the switches, preferably with a positioning unit which may comprise, for example, a laser and mirror or an array of light emitting diodes.

By using the foregoing techniques, switches may be controlled with hardware which is smaller and lighter than the known hardware. In addition, thousands of switches may be activated and controlled quickly without any wiring system.

DETAILED DESCRIPTION OF THE PREFERRED EMBODIMENTS

Figure 1:
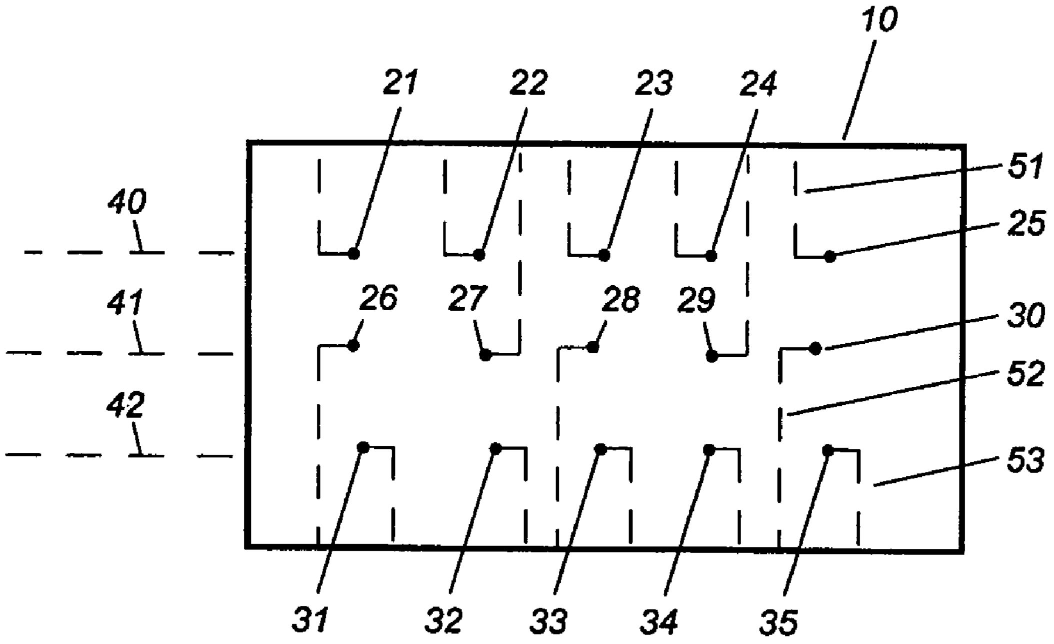
Fig. 1 (Prior Art)
FIG. 1 is a schematic diagram illustrating a conventional prior art circuit board for a 15 element MEMs circuit accessed by control wires which are grown into the circuit board.

Referring to FIG. 1, a conventional MEMs circuit comprises a circuit board 10 on which 15 MEMs 21–35 (represented by dots) are mounted in a well known manner. MEMs 21–25 are arranged in a row along a line 40, MEMs 26–30 are arranged in a row along a line 41, and MEMs 31–35 are arranged in a row along a line 42. The MEMs 21–35 are spaced 1 unit from each other and are accessed and controlled by independent conductors grown into circuit board 10, such as control lines 51, 52 and 53. Circuit board 10 may comprise a semiconductor chip, or a conventional circuit board on which copper control lines are etched. Additional details about MEMs and lines used to control them are described in U.S. application Ser. No. 09/676,007, entitled "Radio Receiver Automatic Frequency Control Techniques," filed Sep. 29, 2000, in the name of Michael H. Myers, assigned to a common assignee and incorporated into this application by reference.

One application for circuit board 10 is a micro-thruster for an orbiting satellite. When current is applied to one of control line 51, a small resistor connected to the control line (not shown) is heated which causes the actuation of MEMs 25, connected to the energized control line. The actuated MEMs creates a micro-thrust.

Figure 2:
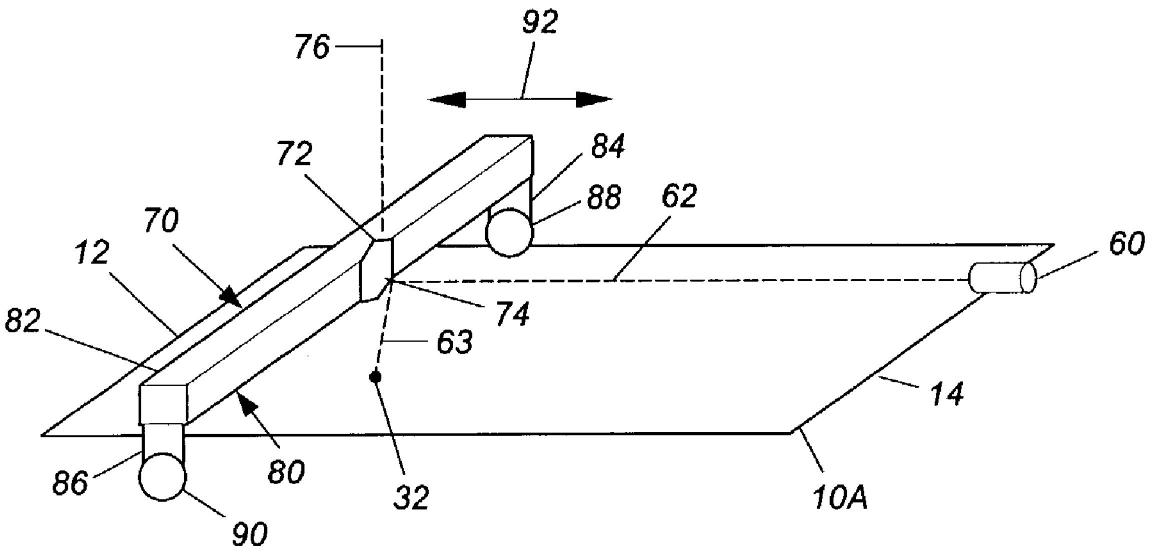
FIG. 2 is a schematic diagram illustrating a preferred embodiment of the invention utilizing a laser beam and mirror.

Referring to FIG. 2, the preferred embodiment includes a circuit board 10A which is like board 10, except that there is no need for control lines 50. A source of light, such as a laser 60, is located at one end of board 10A as shown. As used in this specification, the term light means not only visible light, but other radiation in the electromagnetic spectrum near the visible light band, including infrared radiation and ultraviolet radiation.

Laser 60 generates a laser beam along a path 62 to a positioning unit 70 which includes a mirror 72 having a flat reflective surface 74. Surface 74 reflects the laser beam onto MEMs 32 along a path 63, thereby actuating MEMs 32. Mirror 72 is rotatable around a vertical axis 76 in order to move path 63 to other MEMs aligned with MEMs 32, such as MEMs 27 and 22.

Positioning unit 70 also includes a scanning unit 80 which comprises a bar 82 arranged parallel to the surface of board 10A. Mirror 72 is rotatably mounted on bar 82 as shown. Bar 82 is carried by legs 84 and 86 which in turn are carried by wheels 88 and 90. The wheels 88 and 90 are rotated to cause bar 82 to move in the opposite directions indicated by arrow 92. Thus, bar 82 can be moved from end 12 to end 14 of board 10A and from end 14 to end 12.

In use, laser 60 is pulsed to generate pulses of light along path 62. Mirror 72 reflects the pulses of light onto desired MEMs. Scanning is performed one row at a time while bar 82 is moved in one of the directions indicated by arrow 92, and rotating mirror 72 is moved to cover each MEMs on board 10A. A pulse of light from laser 60 has enough energy to actuate one of the MEMs in a well known manner. For example, an optical window could be used to seal the MEMs, and laser light of sufficient intensity could be directed through the window to actuate the MEMs. Alternatively, a resistive element could be buried just below the surface of the MEMs, and the light beam could be directed against the resistor. The light striking the resistor would heat the resistor which, in turn, would heat the MEMs to cause actuation. If a MEMs is not intended to be actuated, laser 60 is momentarily deactivated so that no light is generated as path 63 is positioned toward the MEMs.

As an alternatively to the embodiment shown in FIG. 2, mirror 72 could be angled to cover the MEMs on board 10A in sectors. In this embodiment, bar 82 could remain stationary.

Figure 3:
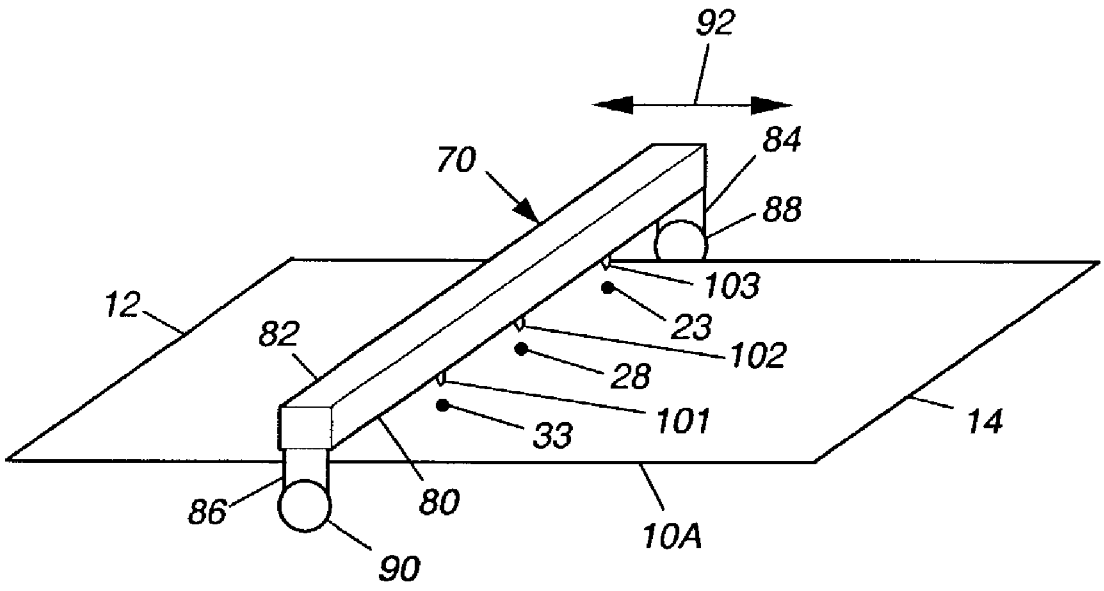
FIG. 3 is a schematic diagram illustrating an alternative embodiment of the invention utilizing a row of light emitting diodes mounted on a movable scan bar.

Referring to FIG. 3, the underside of bar 82 is fitted with three light emitting diodes 101–103 aligned in a row corresponding to a column of MEMs, such as 23, 28 and 33. That is, diodes 101–103 are spaced in the same manner as a column of MEMs, such as 23, 28 and 33. In use, bar 82 is moved from end 12 to end 14 of board 10A so that diodes 101–13 pass over successive columns of MEMs. As bar 82 passes over the MEMs, the diodes are selectively pulsed to generate one to three beams of light which strike selected ones of the MEMs. The beams of light from the diodes actuate the MEMs in the same manner described in connection with the laser beam shown in FIG. 2.

While particular elements, embodiments and applications of the present invention have been shown and described, it will be understood that the invention is not limited thereto since modifications may be made by those skilled in the art, particularly in light of the foregoing teachings. It is therefore contemplated by the appended claims to cover such modifications as incorporate those features which come within the spirit and scope of the invention. For example, thousand or tens of thousands of switches may be activated and controlled by this system. Or as another example, the light beams described in the specification need not be used to activate only micro thruster MEMs, but could be used to activate other types of MEMs, such as phase shifters for phased arrays. In the latter case, the MEMs would be configured for multiple activation and reset and not just for single firings. The intensity of the light in the beams could be used to shift the phase and/or amplitude of a phase shifter circuit.

What is claimed is:

1. In an array of micro electromechanical switches fabricated on a substrate, said array of micro electromechanical switches including a plurality of spatially separated micro electromechanical switches, an apparatus for actuating the switches comprising:

a source of a light beam, said light beam being operable to actuate the micro electromechanical switches; and a positioning unit arranged to direct the light beam onto predetermined ones of said switches, said positioning unit being movable relative to said substrate, wherein the positioning unit is moved relative to the substrate to allow the light beam to actuate any selected one of the plurality of micro electromechanical switches.

2. Apparatus, as claimed in claim 1, wherein said light beam comprises a beam of infrared radiation.

3. Apparatus, as claimed in claim 1, wherein said light beam comprises a beam of ultraviolet radiation.

4. Apparatus, as claimed in claim 1, wherein said source comprises a laser.

5. Apparatus, as claimed in claim 4, wherein said positioning unit comprises a rotatable mirror.

6. Apparatus, as claimed in claim 5, wherein said positioning unit further comprises a scanning unit carrying said mirror, said scanning unit being movable with respect to said array of micro electromechanical switches.

7. Apparatus, as claimed in claim 1, wherein said source comprises a plurality of light emitting diodes.

8. Apparatus, as claimed in claim 7, wherein said positioning unit comprises a scanning unit carrying said plurality of light emitting diodes, said scanning unit being movable with respect to said array of micro electromechanical switches.

9. In an array of micro electromechanical switches, a method for actuating the switches comprising:

generating at least one light beam for actuating the micro electromechanical switches; and directing the at least one light beam onto a predetermined one of said switches, wherein directing the light beam includes moving a positioning unit relative to the switches to direct the light beam to all of the switches.

10. A method, as claimed in claim 9, wherein said generating said at least one light beam comprises generating infrared radiation.

11. A method, as claimed in claim 9, wherein said generating said at least one light beam comprises generating ultraviolet radiation.

12. A method, as claimed in claim 9, wherein said generating said at least one light beam comprises generating one or more laser beams.

13. A method, as claimed in claim 12, wherein said directing comprises reflecting.

14. A method, as claimed in claim 13, wherein said reflecting is accomplished with a reflecting surface and wherein said reflecting further comprises moving said reflecting surface with respect to said array of micro electromechanical switches.

15. A method, as claimed in claim 9, wherein said generating comprises generating a plurality of said light beams arranged in a row.

16. A method, as claimed in claim 15, wherein said directing comprises moving said light beams with respect to said array of micro electromechanical switches.

17. A switching device comprising:

a substrate;

a plurality of micro-electromechanical switches fabricated on the substrate;

at least one light source for generating a beam of light, said beam of light being operable to actuate the micro-electromechanical switches; and a positioning unit positioned relative to the substrate, said positioning unit being movable relative to the substrate, said positioning unit directing the beam of light to a selected one of the plurality of micro-electromechanical switches so as to actuate the selected switch.

18. The device according to claim 17 wherein the at least one light source is positioned remotely from the positioning unit and the positioning unit includes a rotatable lens for directing the beam of light to the selected switch.

19. The device according to claim 17 wherein the at least one light source is a plurality of light sources positioned on the positioning unit.

20. The device according to claim 17 wherein the positioning unit includes a bar extending across the substrate.

* * * * *